UNITED STATES PATENT OFFICE.

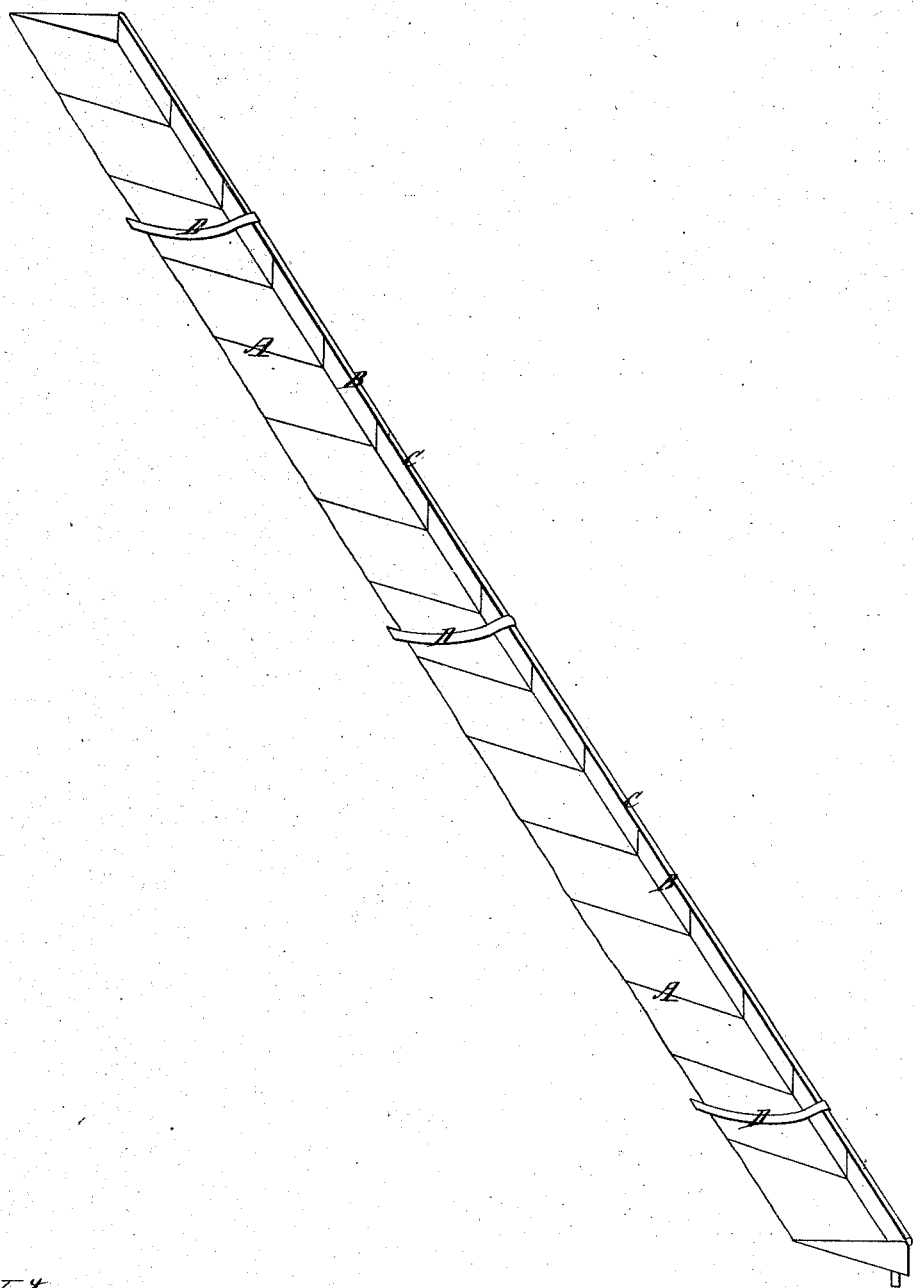

GEORGE W. WHEATLY, OF HARRODSBURG, KENTUCKY.

EAVES-GUTTER OF HOUSES.

Specification of Letters Patent No. 12,527, dated March 13, 1855.

*To all whom it may concern:*

Be it known that I, GEORGE W. WHEATLY, of Harrodsburg, in the county of Mercer and State of Kentucky, have invented a new and Improved Mode of Constructing Gutters for Conveying Water from the Eaves of Houses; and I do hereby declare that the following is a full and exact description thereof, reference being had to the accompanying drawing and to the letters of reference marked thereon.

The gutters I construct are placed above the eaves of houses, and to enable others to make and use my invention, I will proceed to describe its construction, &c.

Take sheet copper, tin, zinc, or other metal, and groove, lock, or solder the sheets together, (A) to any length which may be desired; then turn up one edge, say from two to six inches, until the upright part (B) will be perpendicular when placed upon the roof; then, instead of placing a plank or other substance below the gutter to sustain the upright, (as is usual, thereby causing the shingles as well as the plank to rot,) I form a bead or molding (C) upon the upright part of the gutter, or make a bead or molding separately, and then solder it upon the upright; then solder to the bead a strap (D) of the same metal, about one inch wide and of sufficient length to extend to the sheeting above the gutter, to which it is nailed. The upper edge of the gutter is also nailed to the sheeting. The bead or molding and strap thus attached, give sufficient strength to the gutter, without the aid of a plank or other substance to sustain it.

What I claim as my invention and desire to secure by Letters Patent is—

The application of a bead or molding, together with the strap to gutters of the description above, giving strength to the gutter without the aid of a plank or other substance.

GEO. W. WHEATLY.

Witnesses:
  I. F. PULLIAM,
  BEN C. ALLIN.